United States Patent [19]

Jasgur

[11] 4,070,096
[45] Jan. 24, 1978

[54] POLARIZED COSMETIC MIRROR

[76] Inventor: Joseph Jasgur, 7673 Melrose Ave., Los Angeles, Calif. 90046

[21] Appl. No.: 710,369

[22] Filed: Aug. 2, 1976

[51] Int. Cl.² ............... F21V 33/00; G02B 27/28; G02B 5/08
[52] U.S. Cl. .................................. 350/156; 362/19; 362/142
[58] Field of Search ............... 350/156, 97, 101, 300; 240/4.1, 4.2, 6.45 R

[56] References Cited

U.S. PATENT DOCUMENTS

| 2,200,114 | 5/1940 | Konikoff | 240/4.2 |
| 3,711,182 | 1/1973 | Jasgur | 350/156 |

FOREIGN PATENT DOCUMENTS 380,066 9/1932 United Kingdom .............. 240/4.1

Primary Examiner—John K. Corbin
Assistant Examiner—Wm. H. Punter
Attorney, Agent, or Firm—Ralph B. Pastoriza

[57] ABSTRACT

A casing structure supports a circular mirror having a flat polarized surface and an annular window surrounding the circular mirror. A single light source in the casing has its light directed to an annular reflector for passing light out through the annular window to illuminate a subject looking into the circular mirror. The annular window is polarized in a direction different from the polarization of the mirror and may be rotated relative to the circular mirror to change the angle of the respective polarization.

2 Claims, 2 Drawing Figures

POLARIZED COSMETIC MIRROR

This invention relates generally to mirrors used for make-up and the like and more particularly to a polarized cosmetic mirror for highlighting certain areas of a subject's face while avoiding glare.

BACKGROUND OF THE INVENTION

In my U.S. Pat. No. 3,711,182 issued on Jan 16, 1973 entitled GLARELESS MIRROR USING RELATIVELY ROTATABLE POLARIZERS there is shown and described in one embodiment a mirror arrangement which may be utilized as a cosmetic mirror. Essentially, this mirror includes a central circular flat mirror surrounded by an annular window through which light passes by means of curved fluorescent tubes or a plurality of individual incandescent lights disposed in an annular array behind the window. The flat central mirror is polarized in one direction and the window is polarized in another direction but in the embodiment disclosed is rotatable so as to vary the angle between the two polarizations.

With the foregoing arrangement, it is possible to highlight various areas of a subject's face as viewed in the flat mirror and also eliminate glare. The annular configuration for the illumination of the subject has the advantage of avoiding shadows.

While the above described mirror arrangement functions well, in the case of a cosmetic type application, certain improvements would be desirable. One such improvement would be the elimination of the necessity for curved fluorescent type lamps to provide the annular light array since such structures require a ballast and are relatively expensive. Moreover, it would be similarly desirable to avoid the use of a large number of small incandescent lights in an annular array. Not only would the unit then be less expensive to manufacture but in addition there would be avoided the problem of one or more of the lights burning out such probabilities increasing with an increase in the number of individual lights.

Finally, many conventional cosmetic mirrors have a flat mirror on a front surface and a concave mirror on the rear surface so that by simply turning the mirror over, the viewed image is magnified. It would be desirable to incorporate this particular feature in combination with the polarizing techniques described in my heretofore above mentioned U.S. patent.

BRIEF DESCRIPTION OF THE PRESENT INVENTION

With the foregoing considerations in mind, the present invention contemplates a polarized mirror structure similar to that described in my above referred to U.S. patent but particularly designed as a cosmetic mirror and incorporating desirable improvements not available in present cosmetic mirrors.

More particularly, the cosmetic mirror of the present invention comprises a casing structure, a circular mirror supported by the casing structure and having a front surface polarized in a first direction, and an annular window coaxially surrounding the circular periphery of the circular mirror and supported by the casing structure for rotation in its own plane about its axis, the annular window being polarized in a second direction different from the referred to first direction. Rather than multiple lights or curved fluorescent type lights to provide an annular light source for illuminating the subject through the annular window, a single light source is provided which may constitute an inexpensive single incandescent bulb. This sngle light source is supported with the casing and cooperates wih reflecting means which distribute light from the single source in an annular manner to pass through the annular window and illuminate the subject.

Additional features include the provision of a concave mirror on the rear surface of the circular mirror and appropriate structural means for permitting a 180° rotation of the circular mirror about a diameter so that a magnified image may be provided, the magnifying surface also being polarized in the same first given direction as the flat mirror.

As in the case of my previous above-discussed patent, the reflected image can be appropriately highlighted and glare eliminated by adjusting the rotative position of the window relative to the circular mirror which action adjusts the angle between the respective first and second directions of polarization.

BRIEF DESCRIPTION OF THE DRAWINGS

A better understanding of this invention as well as further features and advantages thereof will be had by now referring to the accompanying drawings in which.

DETAILED DESCRIPTION OF THE INVENTION

Figure 1:
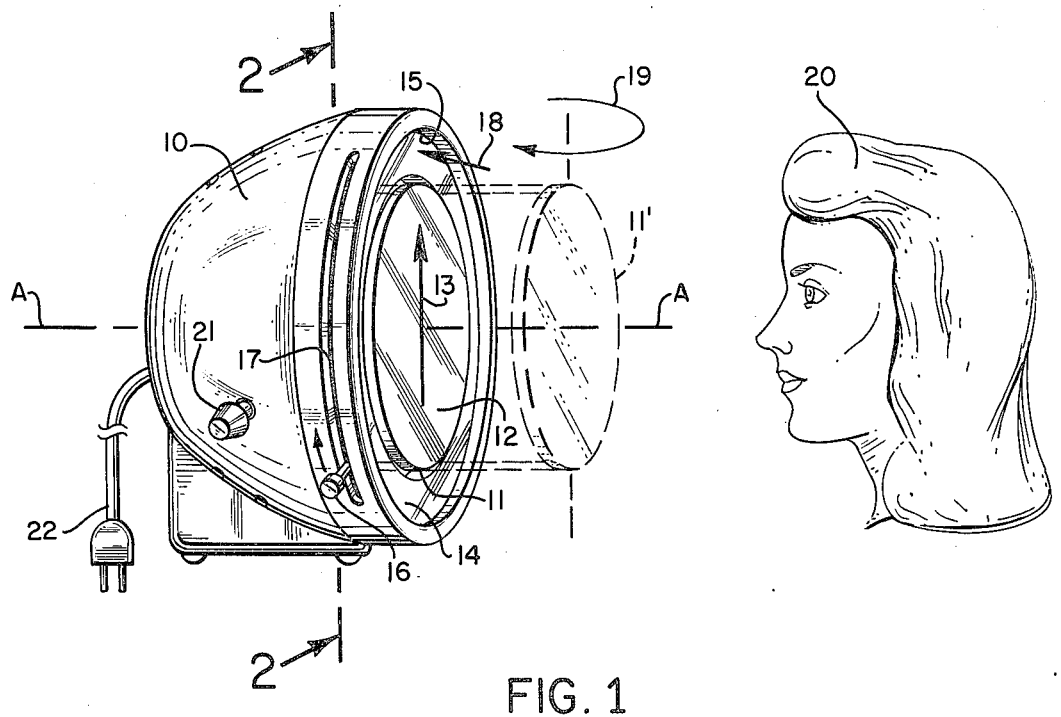
FIG. 1 is a perspective view of the polarized cosmetic mirror of this invention illustrating a woman looking into the mirror; and, cosmetic mirror

Referring first to FIG. 1, the polarized cosmetic mirror includes a casing 10 having appropriate internal structures supporting a circular mirror 11. Mirror 11 has a flat mirror surface 12 on its front face polarized in a first direction as indicated by the arrow 13.

Cooperating with the mirror 11 is an annular window 14 coaxially surrounding the circular periphery of the mirror and supported by the casing structure for rotation in its own plane about its axis. In this respect, the axis of the annular window 14 and of the circular mirror 11 is indicated at A—A.

In the particular embodiment illustrated in FIG. 1, the rotational mounting for the annular window 14 may take the form of an internal annular groove 15 formed in the casing wall within which is received the periphery of the annular window 14. An appropriate handle 16 radially projects from a peripheral point of the annular window 14 through an arcuate slot 17 in the casing as illustrated so that the annular window may be manually rotated by means of the handle 16 through at least 90°.

As indicated by the arrow 18, the annular window 14 is polarized in a second direction different from the first direction 13 for the circular mirror 11. However, upon rotation of the annular window, the difference angle between the first and second directions of polarization may be varied.

Figure 2:
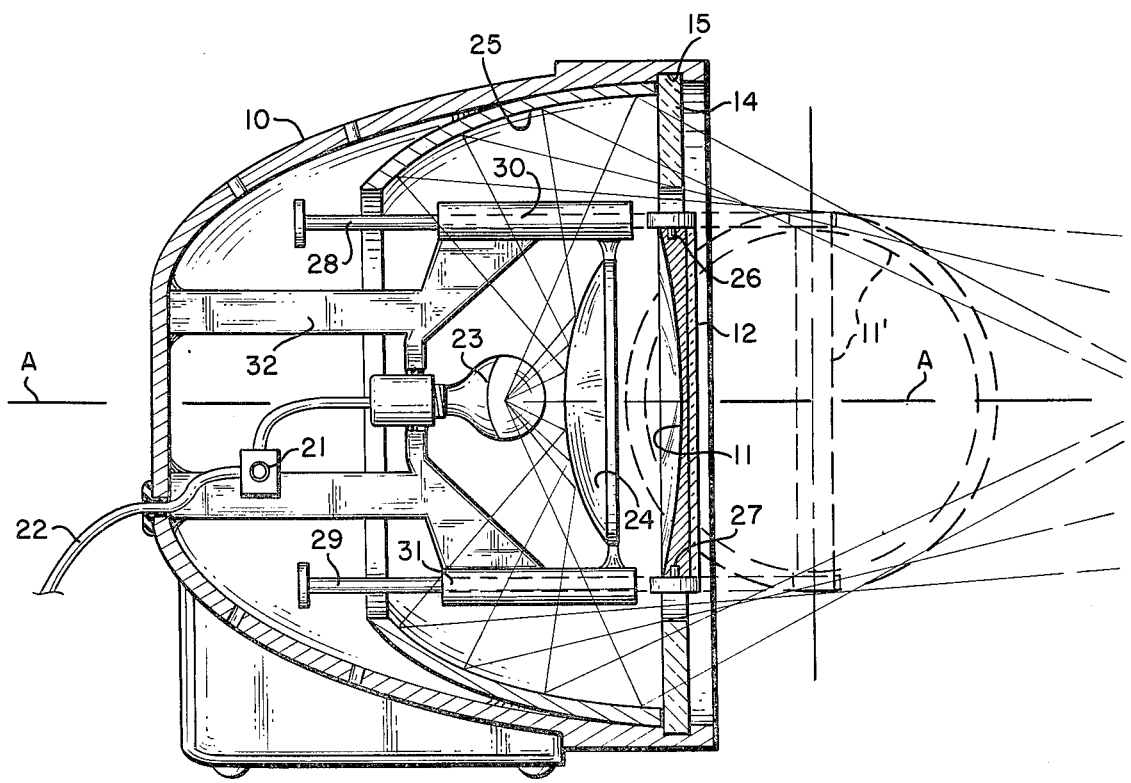
FIG. 2 is an enlarged view partly in cross section and partly in full lines of the polarized cosmeticmirror taken in the direction of the arrows 2—2 of FIG. 1.

As will become clearer with respect to FIG. 2, there is provided a single light source within the casing 10 cooperating with a reflecting means for directing light through the annular window 14 towards a subject such as a woman 19 viewing herself in the mirror.

As will also become clearer as the description proceeds, the circular mirror 11 has a concave mirror on its rear surface and is so supported that it can be pulled from the casing 10 to the dotted line position 11' of FIG. 1 and rotated about a diameter as indicated by the circular arrow 20 and then retracted back to its original position.

Still referring to FIG. 1, there is illustrated a rotatable knob 21 on the side of the casing 10 constituting part of a rheostat means for varying the intensity of the light source within the casing 10. An electrical outlet cord 22 is also shown for plugging into any conventional 110-volt socket to energize the light source within the casing.

Referring now to FIG. 2, further details of the cosmetic mirror will be evident. In FIG. 2, those components which have already been described in conjunction with FIG. 1 are designated by the same numerals. The single light source referred to takes the form of a sole incandescent bulb 23 which, in the embodiment illustrated, lies along the axis A—A rearward of the circular mirror 11.

The reflecting means for directing light from this single light source through the annular window 14 comprises a primary mirror 24 positioned rearward of the circular mirror 11 and in front of the light source 23, and an annular secondary mirror 25 about the inside forward peripheral portion of the casing 10 receiving light from the primary mirror 24 and directing it through the annular window 14. With respect to the foregoing, the curvature and design of the mirrors is such that the light passes through the window 14 and is directed or "focused" onto the subject so that maximum illumination will be assured over 360°.

In FIG. 2 there is shown one type of support structure for the circular mirror 11 permitting the same to be rotated about a diameter to position the rear magnifying surface 12' for proper viewing. This structure includes upper and lower pivot means 26 and 27 for pivoting the mirror for rotation about a diameter preferably in alignment with the direction of polarization indicated by the arrow 13 of FIG. 1. In this respect, the rear magnifying concave mirror 12' is also polarized in the same first direction indicated by the arrow 13 so that the direction of polarization will not change when the mirror is rotated 180°.

From the upper and lower pivot points 26 and 27, guide rods 28 and 29 extend rearwardly in parallel relationship through support guide tubes 30 and 31 respectively. These guide tubes 30 and 31 are in turn supported to the casing 10 by an appropriate frame structure or spider arrangement 32.

With the foregoing arrangement, it will be evident that the circular mirror 11 may simply be withdrawn to the right to the dotted line position and thence rotated and returned, to the guide tubes 30 and 31 fully supporting the mirror during this operation.

The rheostat operable by the knob 21 described in FIG. 1 is illustrated secured to the frame support 32 in FIG. 2 in series with the electrical cord 22 passing to the light source 23.

OPERATION

The operation of the cosmetic mirror of this invention will be evident fom the foregoing description. A subject may view herself in the mirror after the light source 23 has been appropriately energized and because the illuminating light itself passing through the window 14 is polarized in one direction while the reflected image is polarized in another direction, highlights may be accentuated or diminished by interaction of the polarized light, this interaction being controlled by appropriate adjustment of the rotative position of the annular window 14 relative to the circular mirror 11. As described heretofore, any glare can be eliminated by appropriate adjustment of the polarized elements.

In addition, both a flat mirror surface is available as well as a magnifying mirror surface by the simple operation of withdrawing the circular mirror 11 and rotating it 180°.

Finally, the overall intensity of the illuminating light passing out the annular window 14 towards the subject can be controlled by the rheostat knob 21.

Since only a single light source is used, the entire unit can be manufactured for substantially less expense than the case where curved fluorescent bulbs requiring ballasts are used to provide an annular light type of illumination.

While in the preferred embodiment, the light source 23 has been shown on the axis A—A of the circular mirror 11 and annular window 14, it could be positioned elsewhere in the casing and appropriate mirror designs provided for reflecting and guiding the light through the annular window 14 to again provide illumination over 360° properly directed onto the subject.

The polarized cosmetic mirror accordingly is not to be thought of as limited to the specific details shown for illustrative purposes.

What is claimed is:
1. A cosmetic mirror including, in combination:
   a. a casing structure;
   b. a circular mirror supported by said casing structure and having a flat mirror on its front surface polarized in a first direction and a concave mirror on its rear surface polarized in said same first direction, said casing structure supporting said circular mirror in a manner for rotation about a diameter corresponding to said first direction of polarization whereby said circular mirror may be rotated about said diameter 180° so that said concave mirror surface faces forwardly and provides a magnifying mirror;
   c. an annular window coaxially surrounding the circular periphery of said mirror and supported by said casing structure for rotation in its own plane about its axis, said annular window having a surface polarized in a second direction different from said first direction;
   d. a single light source supported in said casing structure behind said circular mirror on the axis of said circular mirror;
   e. a primary mirror on the axis of said circular mirror between said circular mirror and light source for directing light rearwardly and upwardly; and
   f. a secondary mirror of annular configuration positioned to intercept said rearwardly and upwardly directed light from said primary mirror and pass it through said annular window to illuminate a subject in front of said flat mirror surface whereby the light falling on said subject is polarized in said second direction and whereby changing the rotative position of said annular window will vary the difference angle between said first and second directions of polarization.
2. A cosmetic mirror according to claim 1, including rheostat means carried on said casing and connected to said light source for varying the intensity of said light source.

* * * * *